United States Patent Office 3,464,281
Patented Sept. 2, 1969

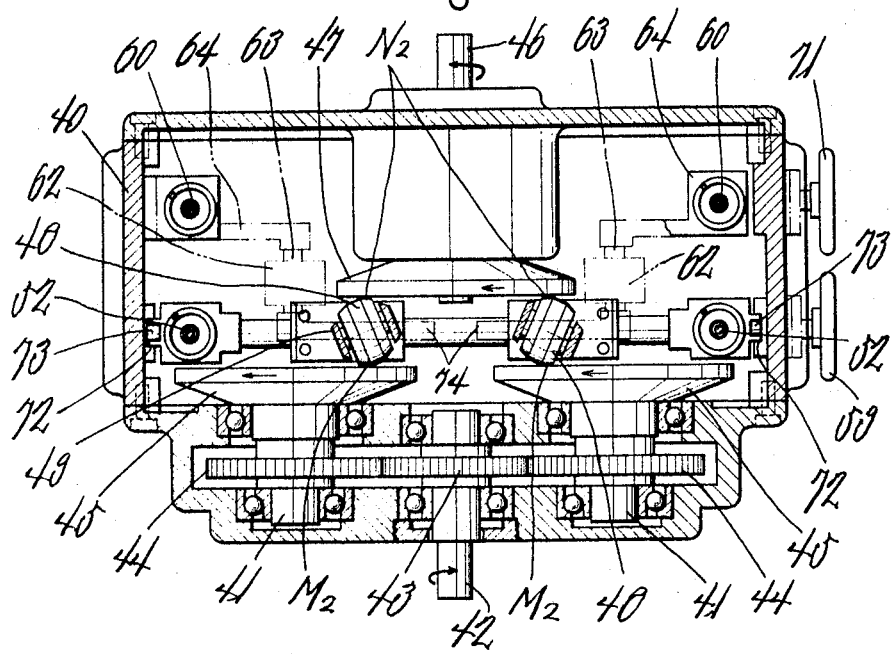
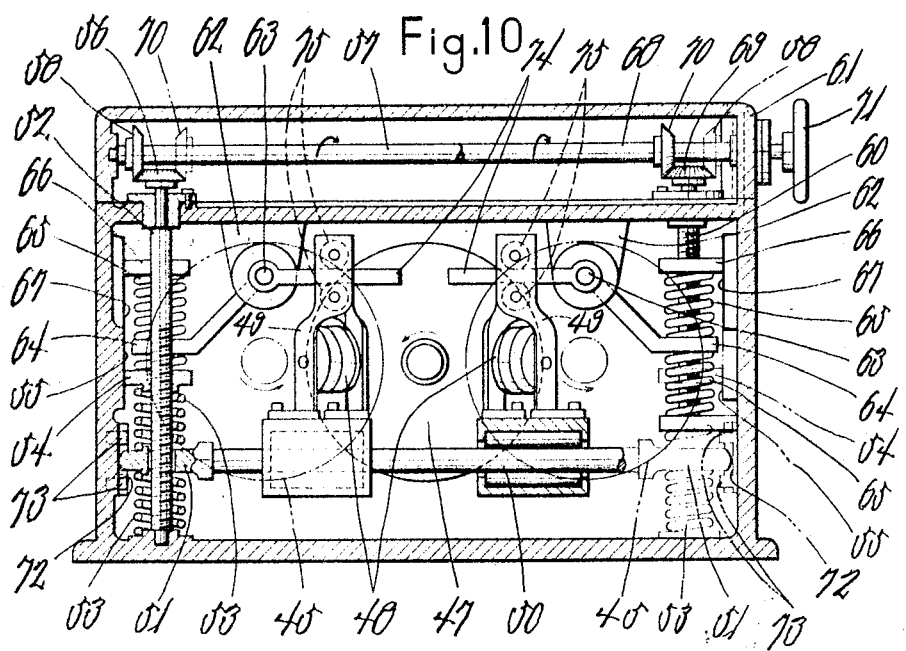

3,464,281
FRICTION-TYPE AUTOMATIC VARIABLE
SPEED MEANS
Hiroshi Azuma, 86, Marusu, Kishigawa-cho, Naga-gun,
Wakayama Prefecture, Japan, and Hiroji Azuma,
Hamaderahigashidanchi 105, 360, Nishi 3-cho, Funao-
cho, Hamadera Sakai, Osaka Prefecture, Japan
Filed Oct. 3, 1966, Ser. No. 583,736
Claims priority, application Japan, Oct. 27, 1965,
40/66,260
Int. Cl. F16h 9/26
U.S. Cl. 74—200                                19 Claims

ABSTRACT OF THE DISCLOSURE

A friction-type automatically variable stepless speed change torque transmission means. A driving shaft and a driven shaft are journalled in a casing, the rotational axes of said shafts being spaced apart and parallel with each other, and a disc-shaped driving friction wheel and a disc-shaped driven friction wheel are secured to the inner ends of said driving and driven shafts respectively, said driving and driven friction wheels being arranged face to face and spaced apart. A roller-type idler wheel is disposed on a support shaft between said driving and driven friction wheels in drivable frictional engagement therewith. Movable support means is rockably mounted in said casing and carries said idler wheel support shaft so as to permit free shifting movement thereof in either direction along a common plane passing through the rotational axes of said disc-shaped wheels freely to change the speed ratio and also so as to permit free movement of said idler wheel for a small distance in either direction across the common plane from the neutral position thereof in the common plane. Resilient means is in pressure engagement with a part of said movable support means for supplying a resilient support force to the support shaft of said idler wheel in a direction perpendicular to the common plane.

SPECIFICATION

The present invention relates to a friction-type automatically variable stepless speed change torque transmission means in which the speed ratio is variable completely automatically with a change in the load torque applied to the driven shaft and which is stable at the position where the output driving torque and the load torque are balanced.

In this specification, the term "speed ratio" will be taken to mean the ratio of the speed of rotation of the driven member to the speed of rotation of the driving member, and the term "torque speed characteristic" will be taken to mean the characteristic showing the relationship between the output driving torque and the speed ratio. The term "power constant characteristic" will be used to designate the characteristic that the power transmitted from the driving shaft to the driven shaft is kept substantially constant over the whole range of variation of the speed ratio and the term "torque constant characteristic" will be used to designate the characteristic that the output driving torque transmitted to the driven shaft is kept substantially constant over the same range. The term "intermediate characteristic" will be used to designate a characteristic intermediate between a power constant characteristic and a torque constant characteristic.

Usually, it is necessary for conventional friction-type automatically variable speed change torque transmission means to employ means for detecting the rotation speed or the load torque of the driven shaft and feedback means for controlling the speed ratio by means of a supplementary power means, e.g., a hydraulic power means, a pneumatic power means, an electric power means or the like. In this case, however, the speed means itself can not be given a torque speed characteristic such as that typical of a direct current motor. The friction-type automatically variable stepless speed change torque transmission means according to the present invention is constructed so that it has such a torque speed characteristic.

It is a main object of the present invention to provide friction-type automatically variable stepless speed change torque transmission means in which the action of speed variation is wholly automatic, smooth and stable, especially for high speed rotation.

Another object of the invention is to provide such a friction-type torque transmission means in which the torque speed characteristic has a predetermined characteristic such as a power constant characteristic, a torque constant characteristic or an intermediate characteristic.

A further object of the invention is to provide such a friction-type torque transmission means in which the torque speed characteristic can be optionally selected so as to be suitable for each case and set into the torque transmission means easily.

Still another object of the invention is to provide such a friction-type torque transmission means in which the output driving torque is easily adjustable by a controlling operation.

A still further object of the invention is to provide such a torque transmission means which has brake gears by which braking power imparting a braking torque is generated from the driven shaft and transmitted to the driving shaft without any consumption of the power except transmission loss.

A further object of the invention is to provide such a friction-type torque transmission means which has a simple construction and is relatively inexpensive.

Other objects and advantages of the invention will be apparent from the following description and the drawings, in which;

FIGURE 9 is a sectional plan view of the second embodiment of the torque transmission means according to the invention;

FIGURE 10 is a transverse sectional view thereof;

Figure 1:
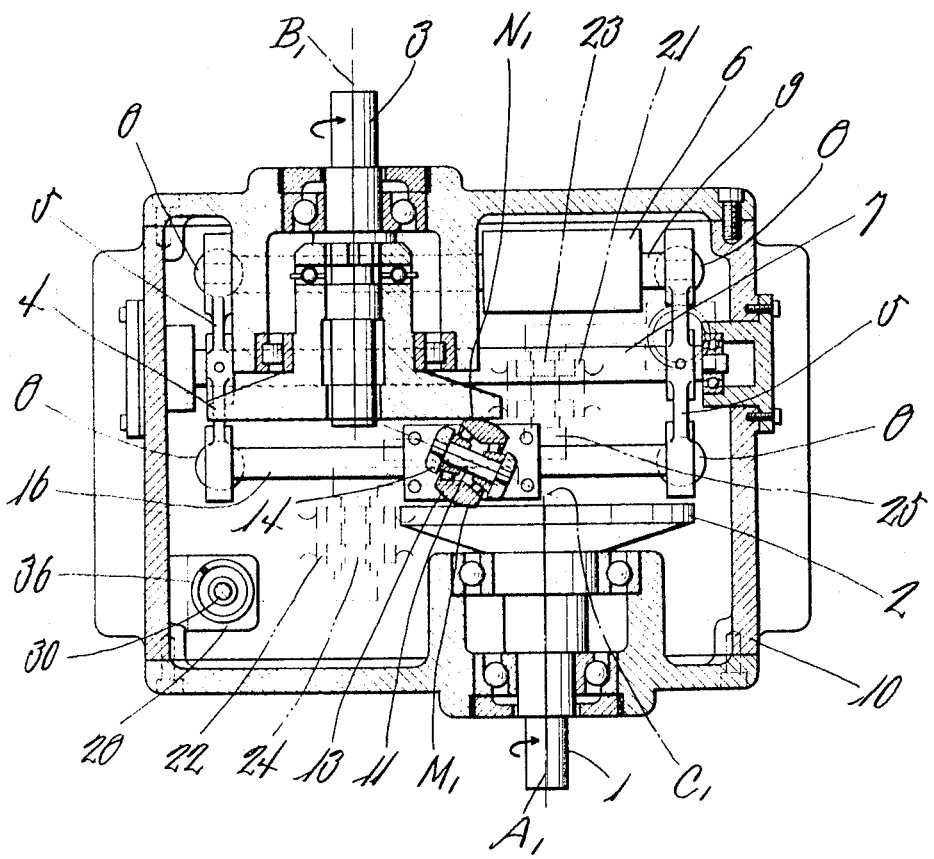
FIGURE 1 is a sectional plan view showing a first embodiment of a torque transmission means according to the present invention.
Figure 2:
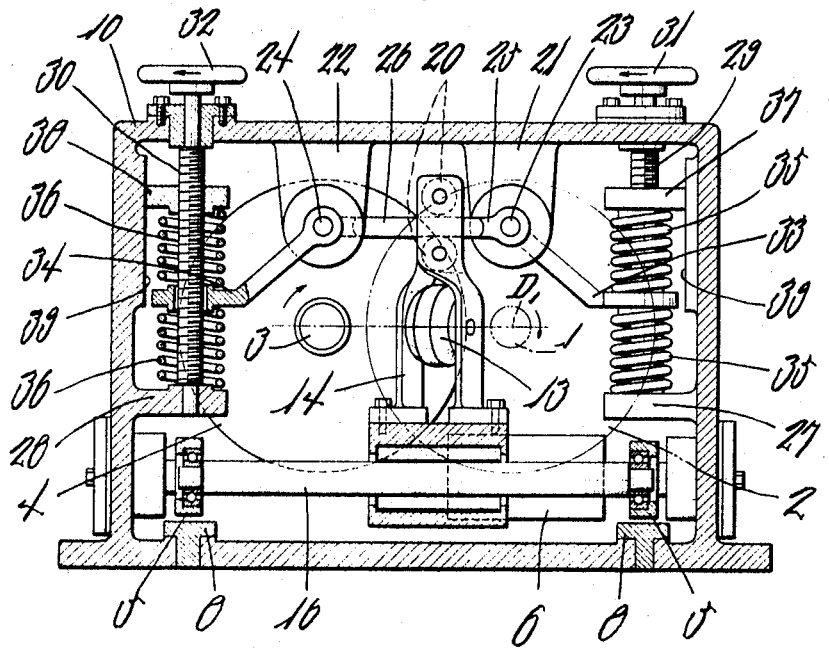
FIGURE 2 is a transverse sectional elevation view thereof.
Figure 3:
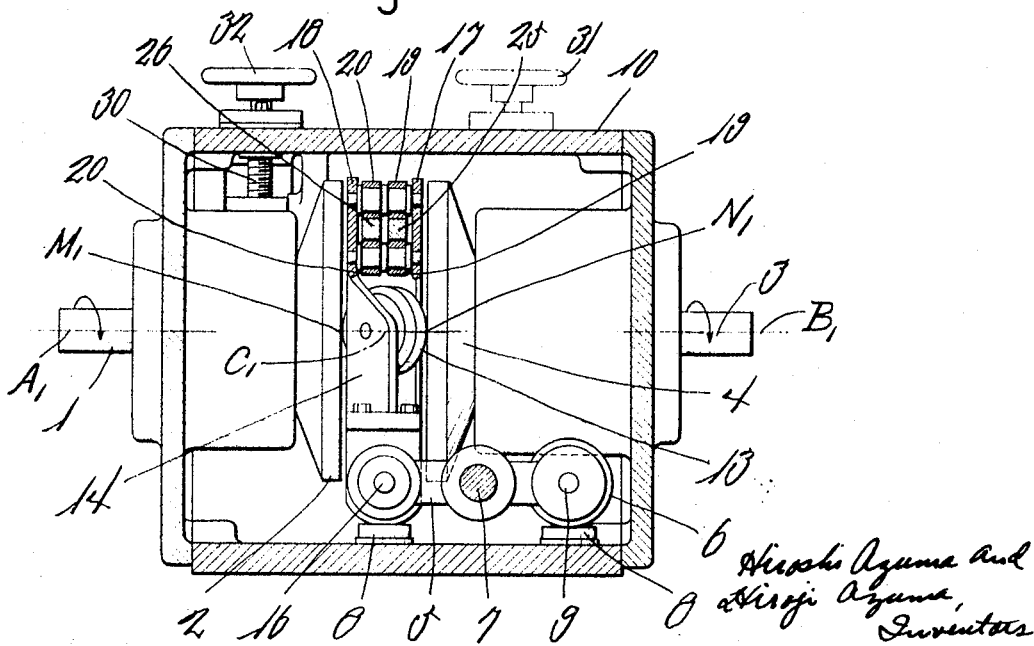
FIGURE 3 is a longitudinal sectional side elevation view thereof.

In the first embodiment, shown in FIGURES 1, 2 and 3, a driving shaft 1 and a driven shaft 3 are rotatably mounted in the front and back walls of a casing 10 on antifriction bearings. The axis $A_1$ of the driving shaft 1 and the axis $B_1$ of the driven shaft 3 are spaced apart and parallel with each other and lie in a common plane $D_1$.

On the inner end of the driving shaft 1 is fixed a disc-shaped driving friction wheel 2, and a disc-shaped driven friction wheel 4 is rigidly mounted on the inner end of the driven shaft 3 through a thrust coupling. A cylindrical idler wheel 13 having a tapered face on both sides of the outer circumference thereof is positioned between said friction wheels 2 and 4 and is in frictional engagement therewith at pressure contact points $M_1$, $N_1$. Side idler wheel 13 is rotatably mounted on antifriction bearings on a support shaft 11 fixed in an oblique position with respect to said friction wheels in the middle of a supporting frame 14. The lower portion of frame 14 is rotatably mounted and axially slidable on sliding bearings on a rocker shaft 16.

Said rocker shaft 16 is mounted on the front ends of a pair of right and left rocker arms 5, the middle portions of which are fixed to a horizontal balancing shaft 7 rotatably mounted on antifriction bearings between the side walls of the casing 10. Also, mounted between the back ends of said rocker arms 5 is a shaft 9, on which a weight 6 is mounted to counterbalance the weight of the idler wheel 3, shaft 11, frame 14 and shaft 16. The lower portions of both ends of the rocker arms 5 are restricted for movement within a small range by means of dampers 8 which can be made of rubber or the like, and projecting upwardly from the bottom of the casing 10.

The axis $C_1$ of said idler wheel 13 is located in the common plane $D_1$ in the neutral position, and when the rocker arms 5 are moved slightly, the axis $C_1$ can deviate slightly upwards or downwards from the plane $D_1$.

Between a supporting piece 17 and a supporting piece 18 provided at the upper end of said supporting frame 14 are mounted spaced opposed pairs of top and bottom rollers 19 and 20. On projecting portions 21 and 22 depending from the top wall of the casing 10 and on opposite sides of the position of shaft 16 are rotatably mounted pivot shafts 23 and 24. They are spaced upwards from and are parallel with the axes $A_1$ and $B_1$. Force supplying levers 25 and 26 are fixed to said shafts 23 and 24 and extend horizontally between said rollers 19 and 20, respectively.

Between fixed receiving pieces 27 and 28 projecting from opposite side walls of the casing 10 and the top wall of the casing 10, are rotatably mounted threaded rods 29 and 30. These rods are fixed against axial movement. The upper ends of said threaded rods 29 and 30 extend through the top wall of the casing 10, and to the upper ends thereof are fixed handles 31 and 32, respectively.

Said threaded rods extend freely through holes located at the ends of force receiving levers 33 and 34 which are fixed to said shafts 23 and 24, respectively. A pair of upper and lower springs 35 are mounted around the rod 29 above and below the end of the force receiving lever 33, and a pair of upper and lower springs 36 mounted around the rod 30 above and below the end of the force receiving lever 34. A force supplying plate 37, is located above the upper spring 35 and has the threaded rod 29 threadedly engaged therewith. Force supplying plate 37 is non-rotatably slidable against a vertical guide surface 39 formed on the inside of the side wall of the casing 10. A similar force supplying plate 38 is positioned above the upper spring 36 and has the threaded rod 30 threadedly engaged therewith. It is nonrotatably slidable against vertical guide surface 39 formed on the inside of the opposite side wall of the casing 10.

Now, for example, if the threaded rods 29 and 30 are turned clockwise as viewed from above, in the direction of the arrows in FIGURE 2 by handles 31 and 32 since the rods 29 and 30 each have a righthanded thread, the force supplying plates 37 and 38 move upwards, so that the upper springs 35 and 36 extend upwards and the upward resilient forces of the lower springs 35 and 36 are applied to the force receiving levers 33 and 34. As a result, downward forces are supplied to the supporting frame 14 through the pivot shafts 23 and 24, the levers 25 and 26 and the rollers 19 and 20, respectively.

If handles 31 and 32 are turned in the opposite direction, the downward forces applied to the supporting frame 14 are decreased.

Thus, by turning handles 31 and 32 the downward supporting forces being transmitted from springs 35 and 36 to the supporting frame 14 can be controlled.

Figure 4:
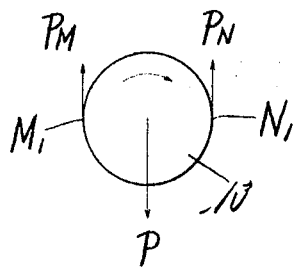
FIGURE 4 is a diagram showing the directions of forces which act upon an idler wheel in the torque transmission means.

In the present means, when downward forces are applied to the supporting frame 14 by turning the handles 31 and 32 in the direction of the arrows, if the driving and the driven shafts 1 and 2 are rotated in the direction of the arrows as shown in FIGURES 1, 2 and 3, the tangential driving forces corresponding to the load torque applied to the driven shaft 3 as shown in FIGURE 4 act upwards at the pressure contact points $M_1$ and $N_1$ of the idler wheel 13 with the friction wheels 2 and 4. Consequently, the supporting frame 14 has the upward driving forces exerted thereon and the speed ratio can be varied automatically so that the axis $C_1$ of the idler wheel 13 will always be maintained in the neutral position by balancing said driving forces and said supporting forces.

Such automatic speed variation is brought about by the sliding frictional forces created in a direction along the plan $D_1$ and across the loci of the pressure contact points on the idler wheel, as will be illustrated in FIGURES 4 to 7.

Figure 5:
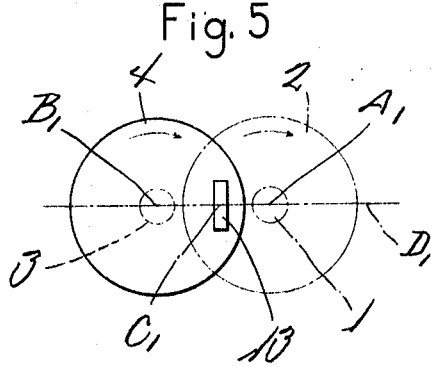
FIGURES 5–7 are schematic illustrations of how the apparatus acts to automatically vary the speed.

As shown in FIGURE 4, representing the upward driving forces on idler wheel 13 at the pressure contact points $M_1$ and $N_1$ as $P_M$ and $P_N$ and the sum of the supporting forces, exerted downwards on the supporting frame 14 as P, when the driving and the supporting forces are in balance and $P_M + P_N = P$, the axis $C_1$ of idler wheel 13 is situated in the plane $D_1$, as in FIGURE 5, in the neutral position, and at the pressure contact points $M_1$ and $N_1$, the tangential directions of the loci of the contact points on the driving side and on the driven side are completely in accord with each other and no sliding frictional forces are created in a direction along plane $D_1$ across the loci of the contact points of the idler wheel 13 with the driving and driven wheels 2 and 4. Therefore, the speed ratio is stable at the balanced position. At this moment the load torque applied to the driven shaft and the output driving torque are in a balanced and stable state.

Figure 6:
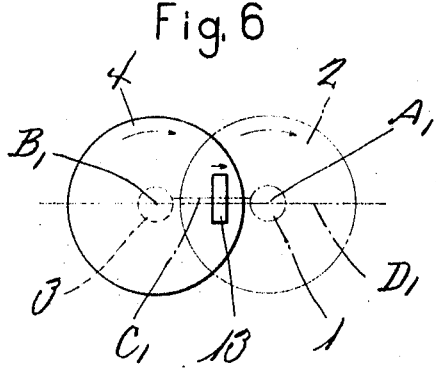

Next, if the load torque becomes excessive and $$P_M + P_N > P$$

the axis $C_1$ deviates minutely in a direction upwards from the plane $D_1$ of the neutral position as shown in FIGURE 6. Consequently, at the pressure contact points $M_1$ and $N_1$, the tangential directions of the loci of the contact points are deflected through a minute angle and due to the rolling contact transmission, sliding frictional forces are imposed on the idler wheel 13 in a direction substantially perpendicular to said tangential directions, that is, in this case in the rightwards horizontal direction in FIGURE 6. Therefore the idler wheel 13 is shifted rightwards along the rocker shaft 16 together with the supporting frame 14. As a result, the pressure contact point $M_1$ approaches the axis $A_1$ while the pressure contact point $N_1$ moves away from the axis $B_1$. Consequently, the speed ratio is automatically and gradually decreased until the driving forces and the supporting forces return to an equilibrium state and the axis $C_1$ returns to the plane $D_1$. Thereafter, the stable state continues.

Figure 7:
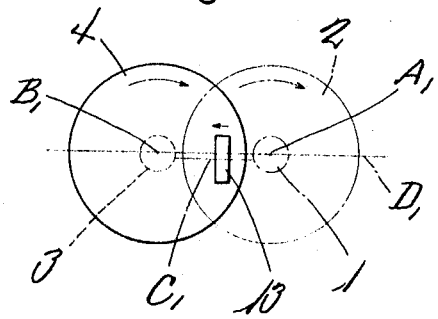

On the other hand, if the load torque becomes too small and $P_M+P_N<P$, the axis $C_1$ deviates minutely in a direction downwards from the plane $D_1$ of the neutral position as shown in FIGURE 7, and the sliding frictional forces are imposed on the idler wheel 13 in the lefthand horizontal direction in FIGURE 7 at both pressure contact points $M_1$ and $N_1$. Thus, the idler wheel 13 is shifted leftwards, and the speed ratio is automatically and gradually increased until the axis $C_1$ returns to the plane $D_1$ at a position where the driving forces and the supporting forces are in a balanced state, and thereafter the speed ratio remains in a stable state.

In practice, especially for a high speed rotation drive, since the load torque always contains small wave-like variations, the axis $C_1$ carries out repeated minute up and down deviations around the neutral position as a central position, so that the speed ratio has small wave-like variations due to automatic actions such as described above. From the macroscopic viewpoint, however, it will be understood that the speed ratio has a definite mean value corresponding automatically and stably to a definite mean value of the load torque, and the driving forces and the supporting forces are always maintained in a balanced state.

As shown in FIGURE 2, the positions of the shafts 23 and 24 are such that the effective transmission radii of the friction wheels 2 and 4 and the effective acting radii of the levers 25 and 26 against said supporting frame 14 are equal. The supporting force exerted through the lever 25 varies in reverse proportion to the effective transmission radius of the driving friction wheel 2, so that it keeps the input driving torque constant, while the supporting force exerted through the lever 26 varies in reverse proportion to the effective transmission radius of the driven friction wheel 4, so that its action keeps the output driving torque constant. Thus, said levers 25 and 26 act to provide a power constant characteristic and a torque constant characteristic respectively.

Figure 8:
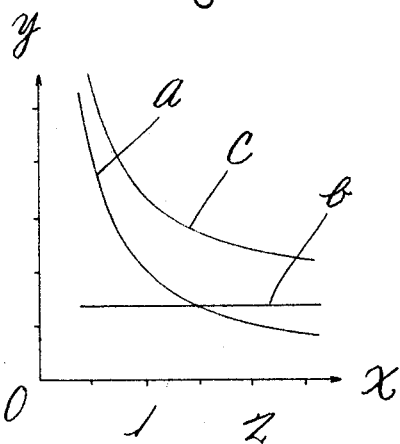
FIGURE 8 is a graph showing the torque speed characteristic.

The output driving torque can be adjusted by causing the force supplying plates 37 and 38 to move up or down by means of handles 31 and 32, and the results are shown in FIGURE 8. If the speed ratio $x$ is taken as the abscissa and the output driving torque $y$ as the ordinate in this diagram, the torque-speed characteristics are represented by a hyperbola $a$ in the case of operation of only the lever 25, by a horizontal straight line $b$ in the case of operation of only the lever 26, and by a curve $c$ which is a resultant of curves $a$ and $b$ in the case of operation of both levers, respectively. The desired torque-speed characteristic curve can be easily selected by operating handles 31 and 32. Moreover, it is possible to change the positions of the shafts 22 and 23 to other suitable positions if desired.

The second embodiment, shown in FIGURES 9 and 10 has a driving shaft 42 and a pair of transmission shafts 41 spaced from and parallel with said driving shaft 42 on opposite sides thereof and rotatably mounted in antifriction bearings in the front wall of a casing 40. A gear 43 fixed to the middle portion of said driving shaft 42 is meshed with gears 44, rigidly mounted on said transmission shafts 41, and rotation of the driving shaft 42 causes the transmission shafts 41 to be rotated in the same direction at the same speed. To the inner ends of the transmission shafts 41, are fixed disc-shaped driving friction wheels 45, and to the inner end of a driven shaft 46 rotatably mounted in bearings in the middle of the back wall of the casing 40 is secured a disc-shaped driven friction wheel 47 through a thrust coupling (not shown in the figures).

Cylindrical idler wheels 48 having two tapered faces on the opposite ends thereof are positioned between said friction wheels 45 and 47 and are in frictional engagement therewith at the pressure contact points $M_2$ and $N_2$. Said idler wheels 47 are nonslidably rotatably mounted on the support shafts 76 fixed in opposite oblique relation with said friction wheels 45 and 47 on intermediate portions of supporting frames 49. The lower ends of said supporting frames 49 are rotatably and axially slidably mounted on a rocker shaft 50 on sliding bearings.

At both ends of said rocker shaft 50 are integral force receiving plates 51, and oppositely threaded rods 52 extend freely through holes in said force receiving plates 51. The rods 52 are nonslidably rotatably mounted at both sides inside of the front portion of the casing 40. Two pairs of upper and lower springs 53 are mounted around said threaded rods 52, above and below the force receiving plates 51. Force supplying plates 54 which are threadedly engaged with the threaded rods 52 are positioned above the upper springs 53 and are in nonrotatable sliding contact with guide surfaces 55 formed on the inside surfaces of the front portion of the side walls of the casing 40.

Said force receiving plates 51 also have the extreme ends slidably engaged in vertical guide channels 72 formed in the lower portion of the inside surface of the front portion of the side walls of the casing 40, and the distance said plates can move along said vertical channels 72 is restricted by means of stop pins 73 fixed in the upper and lower portions of said channels 72.

The upper ends of said threaded rods 52 extend through the top wall of the casing 40 and project into an upper casing 61, and to the upper ends of the screw rods 52 are fixed bevel gears 56 which mesh with a pair of bevel gears 58 mounted rigidly on a horizontal manipulating shaft 57 rotatably mounted inside the upper casing 61. By turning handle 59 fixed to the end of the manipulating shaft 57 projecting out of the upper casing 61 the threaded rods 52 can be rotated in opposite directions to each other, and at the same time the force supplying plates 54 are forced to move in opposite directions to each other. The rocker shaft 50 thus has applied thereto a couple of forces through the force receiving plates 51 due to the extension and compression of the respective upper springs 53, so that the supporting forces are supplied to the support frames 49 in opposite directions to each other.

On both sides of the back portion of the casing 40 are non-slidably rotatably mounted oppositely threaded rods 60 which extend freely through holes located at the ends of pressure receiving levers 64. Levers 64 are fixed to pivot shafts 63 rotatably mounted on a pair of depending projection portions 62 depending from the top wall of the casing 40 in the back portion thereof. Shafts 63 are spaced upwardly from and are parallel with said transmission shafts 41. Two pairs of upper and lower springs 65 are mounted around said threaded rods 60 and are positioned above and below the ends of force receiving levers 64. Force supplying plates 66 which are threadedly engaged with the threaded rods 60 are positioned above the upper springs 65. The force supplying plates 66 are in nonrotatable slidable contact with guide surfaces 67, formed on the inside surface of the back portions of the side walls of the casing 40.

The upper ends of said threaded rods 60 extend through the top wall of the casing 40 and project into the upper casing 61, and bevel gears 70 mounted on a horizontal manipulating shaft 68 rotatably mounted in the upper casing 61, are meshed with bevel gears 69 fixed to the upper ends of the threaded rods 60. To the end of the manipulating shaft 68 projecting out of the upper casing 61 is fixed a handle 71, and when the manipulating shaft 68 is rotated by turning said handle 71, the individual threaded rods 60 are revolved in opposite direction to each other.

Each force supplying lever 74 mounted rigidly to the respective shafts 63, is positioned between a pair of the upper and lower rollers 75 rotatably mounted on the upper portion of supporting frames 49 so that supporting forces generated by the springs 65 are transmitted to the supporting frames 49 in the opposite directions to each other.

In this embodiment, the axes of the idler wheels 48 are located in a common plane passing through the axes of the transmission shafts 41 and the driven shaft 46 when the idler wheels are in the neutral position, and they are able to deviate vertically a small distance from said plane until the ends of the force receiving plates 51 touch stop pins 73.

In this embodiment, if the driving and the driven shafts 42 and 46 are driven so as to rotate in the directions of the arrows in FIGURE 9 and an upward supporting force is applied to the supporting frame 49 on the right side while a downward supporting force is applied to the supporting frame 49 on the left side, due to the transmission from gear 43 to gears 44 the driving friction wheels 45 revolve in the direction of the arrows together with the transmission shafts 41.

At the same time, the idler wheels 48 which are frictionally engaged with the friction wheels 45 at the pressure contact points $M_2$, revolve in opposite directions to each other, so that the friction wheel 47, frictionally engaged with said idler wheels 48 at the pressure contact points $N_2$, is forced to revolve in the direction of the arrow together with the driven shaft 46.

In this case, the supporting frame 49 on the right side of FIGURE 9 is given a downward driving force by the downward driving tangential force acting on the idler wheel 48 on the right side at the pressure contact points $M_2$ and $N_2$, while the supporting frame 49 on the left side has an upward driving force applied thereto by the upward driving tangential forces acting upon the idler wheel 48 on the left side at the pressure contact points M and $N_2$.

Under these circumstances, in the same way as in the first embodiment the idler wheels 48 will be shifted sideways until the driving forces acting at individual contact pressure points $M_2$ and $N_2$ thereof and the supporting forces acting on the supporting frames 49 are in balance. Thus the speed ratio is automatically controlled. In these circumstances, the supporting forces applied to the supporting frames 49 through the force receiving plates 64 produce a power constant characteristic, and the supporting force applied to the supporting frames 49 through the rocker shaft 50 produce a torque constant characteristic. In this respect the present embodiment is as the first example embodiment. In addition, the shifting movements of the idler wheels 48 are synchronized automaticlly with each other without any following mechanism because of the independently deviating movements of said idler wheels 48.

A third embodiment is shown in FIGURES 11 to 14. A driving shaft 81 and a driven shaft 82 are mounted in antifriction bearings in the opposite side walls of a casing 80 and have their axes lying on a common axis line $A_3$. A driving and a driven friction wheels 83 and 84 having a convexly frustoconical shape are rigidly mounted face to face on the inner ends of said driving and driven shafts 81 and 82 through thrust couplings and are spaced from each other. Six spherical idler wheels 90 are rotatably and substantially non-slidably mounted on needle bearings on individual support shafts 89 between friction wheels 83 and 84. They are externally frictionally engaged with both friction wheels 83 and 84 at the pressure contact points $B_3$ and $C_3$ respectively. A ring wheel 93 is freely rotatably mounted around the common axis line $A_3$ and all of said idler wheels 90 are in frictional engagement with the internal surface thereof.

In the inside of the casing 80 are mounted a pair of annular guide plates 85 and 86 which are face to face and are rotatable about the common axis line $A_3$ and positioned on the right and left sides of said group of idler wheels. Said guide plates 85 and 86 each have six radial guide slots 87 and 88, respectively provided at equal intervals therearound. The respective ends of said support shafts 89 are slidably positioned in said radial guide slots 87 and 88 on needle bearings mounted thereon, so that said support shafts 89 can move along said radial guide slots.

Figure 11:
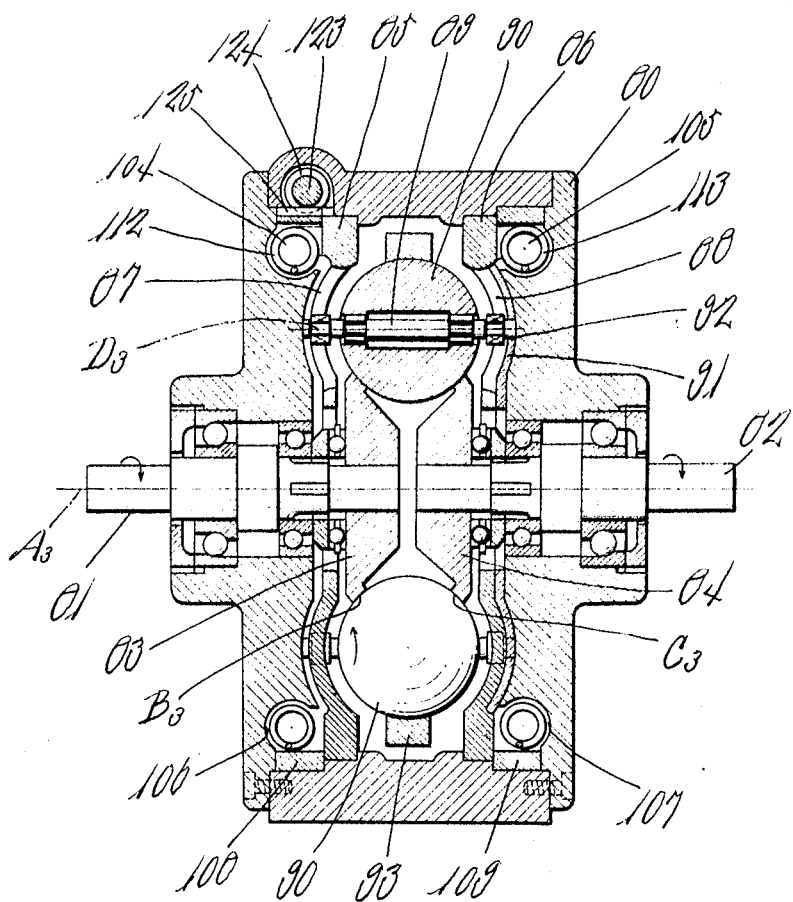
FIGURE 11 is a longitudinal sectional view of a third embodiment of the torque transmission means according to the invention.

Between the right guide plate 86 and the right side wall of the casing 40, as seen in FIGURE 11, is disposed an annular following plate 91 which is rotatable around the common axis line $A_3$. Said following plate 91 has six helical slots 92 therein at equal intervals therearound, into which the right ends of said support shafts 89 are slidably engaged. The radial shifting of said idler wheels 90 is accomplished by the rotation of the following plate 91.

Figure 12:
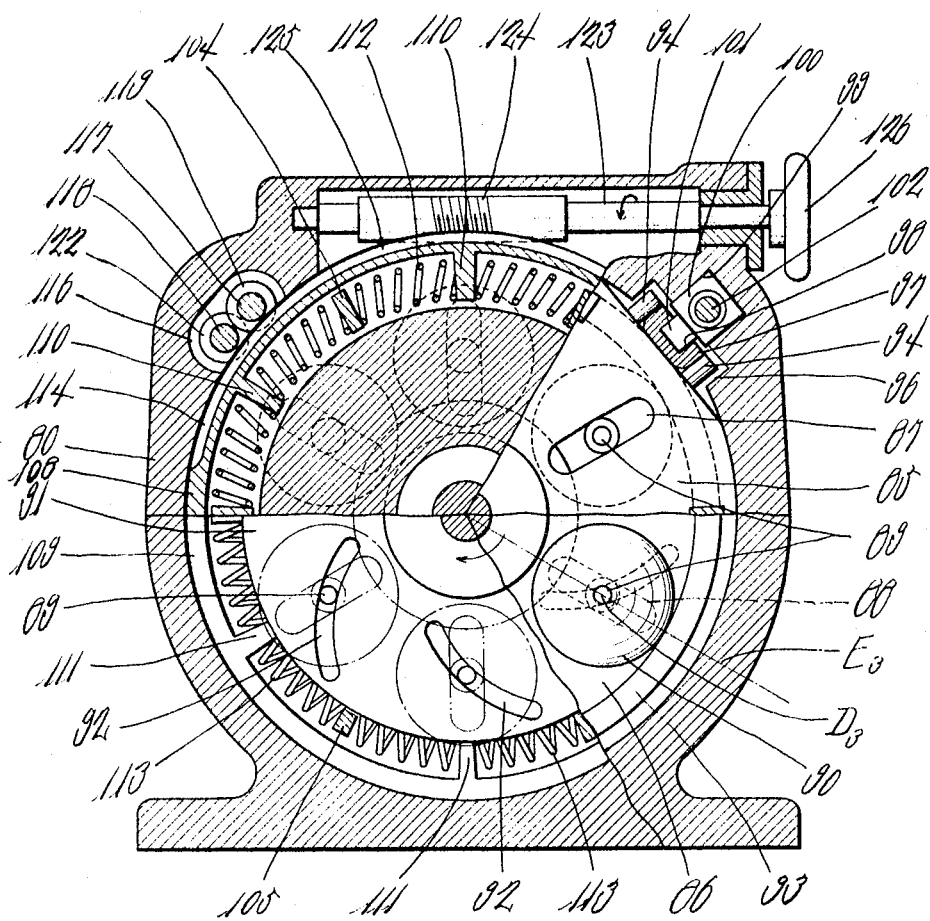
FIGURE 12 is a transverse sectional view thereof.
Figure 13:
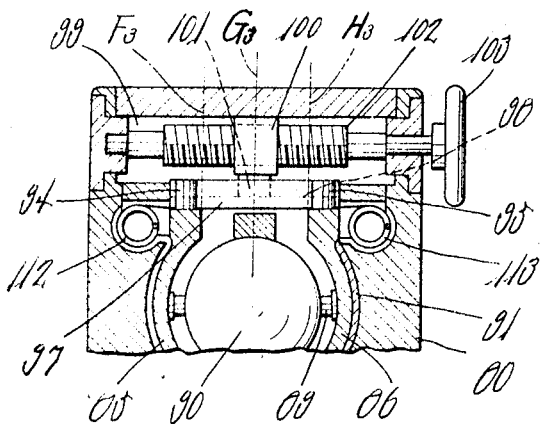
FIGURE 13 is a longitudinal sectional view of a setting shaft therefor.
Figure 14:
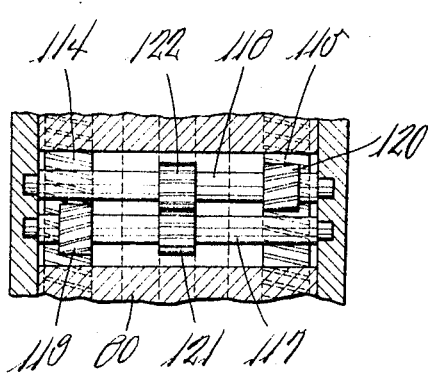
FIGURE 14 is a sectional view of a portion of the gears which mesh with the outer circumferential gears of the adjustable rings thereof.

On the outer circumference of each of said guide plates 85 and 86 are provided, as shown in FIGURES 12 and 13 a pair of pins 94 and 95, which extend into a channel 96 formed in the inside of the casing 80, so that the amounts the guide plates 85 and 86 can turn around axis $A_3$ are limited to small angles.

The ends of a connecting lever 97 are sandwiched and pivoted between the pairs of pins 94 and 95 and a longitudinal channel 98 is formed on said connecting lever 97. A further channel 99 is also formed in said casing in the bottom of said channel 96.

A setting projection 101 is fixed to the lower portion of a slider 100 slidable in the channel 99 and said projection extends into said channel 98 and is rotatable and slidable therein. Consequently, since the connecting lever 97 can swing a small distance around the shaft 101 as a fulcrum, the guide plates 85 and 86 to which the ends of said lever 97 are pivotally connected by pins 94 and 95, can be turned slightly in opposite directions to each other.

In said channel 99 is positioned a threaded rod 102, which is threaded into the female threaded slider 100. Said threaded rod 102 is nonslidably and rotatably mounted with respect to the casing 80, and a handle 103 is fixed to the end of said rod 102 projecting out of the casing 80. The slider 100 slides in the channel 99 when the threaded rod 102 is rotated by said handle 103. Said setting shaft 101 can thus be displaced along the channel 98.

On the side faces of said guide plates 85 and 86 adjacent the outer peripheries are provided six laterally projecting force receiving plates 104 and 105 at equal intervals. The plates 104 and 105 extend into the interior of adjustable rings 108 and 109.

Said adjustable rings 108 and 109 are rotatably mounted in annular channels 106 and 107 formed in the internal circumferential surface on both sides of the casing 80, and on the inner peripheries of said adjustable rings 108 and 109 are provided six force supplying plates 110 and 111 projecting inwardly at equal intervals. The force supplying plates 110 and 111 are interposed between the force receiving plates 104 and 105 respectively, and between the force supplying plates 110 and the force receiving plates 104 and between the force supplying plates 111 and the force receiving plates 105 are twelve springs 112 and 113.

Along a portion of the outer peripheries of the adjustable rings 108 and 109 are helical gears 114 and 115, which are meshed with small helical gears 119 and 120 ridigly mounted on a pair of horizontal shafts 117 and 118 rotatably mounted in a concave portion 116 formed in a part of the inner periphery of the casing 80. Said shafts 117 and 118 are rotated together and in opposite directions to one another by a pair of gears 121 and 122 fixed to the middle of said shafts 117 and 118.

A right-handed worm 124 fixed to a manipulating shaft 123 rotatably mounted in the upper portion of the casing 80 is meshed with a right-handed worm gear 125 which is an extension of the helical gear 114 on the external periphery of said adjustable ring 108. By turning the manipulating shaft 123 by means of a handle 126 fixed to the end thereof projecting from the casing, the adjustable ring 108 can be rotated through the worm 124 and the worm gear 125.

Figure 15:
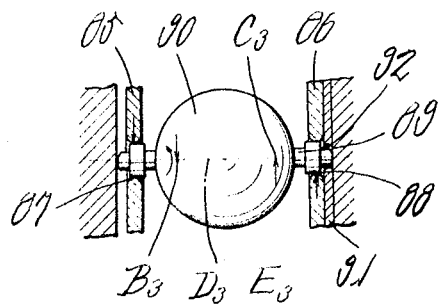
FIGURES 15–17 are illustrations showing the directions of forces acting upon a spherical friction wheel and actions of automatic speed variation thereof.

In the construction as described above, the axis $D_3$ of the support shaft 89 of each spherical idler wheel 90 can deviate slightly to either side of a common plane $E_3$ passing through the common axis $A_3$ and the axis line $D_3$ lying in the neutral position as shown in FIGURE 15. By turning the manipulating shaft 123 in the direction of the arrow in FIGURE 12 by means of the handle 126 the adjustable ring 108 can be rotated counterclockwise as seen in FIGURE 12 by rotation of the right-handed worm gear 124, so that a moment of counterclockwise rotation is applied to the guide plate 85 through the force supplying plates 110, the springs 112 and the force receiving plates 104. On the other hand, the adjustable ring 109 is revolved clockwise as seen in FIGURE 12 through the gears 114 and 119, the shaft 117, the gears 121 and 122, the shaft 118 and the gears 120 and 115, and a moment of clockwise rotation is applied to the guide plate 86 through the force supplying plates 111, the springs 113 and the force receiving plates 105. Thus each of the support shafts 89 for the idler wheels 90 is given a supporting moment in the counterclockwise direction as viewed from center of the casing 80.

Under the above-mentioned conditions, if the driving and the driven shafts 81 and 82 are forced to rotate in the direction of the arrows in FIGURE 11, each idler wheel 90, engaging with the friction wheels 83 and 84 is subjected to tangential driving forces corresponding to the load torque at the pressure contact points $B_3$ and $C_3$, so that the shaft 89 is given a driving moment in the clockwise direction as seen in FIGURE 15 as viewed from center of the casing 80.

In this case the speed ratio is automatically controlled and varied so that the axis line $D_3$ of the shafts 89 will be always maintained in the common plane $E_3$ of the neutral position by balancing said supporting moment and said driving moment. The principle of this automatic action is the same as in the case of the previously described embodiments. The actions of one spherical idler wheel 90 will be discussed in detail in connection with FIGURES 15 to 17.

Figure 16:
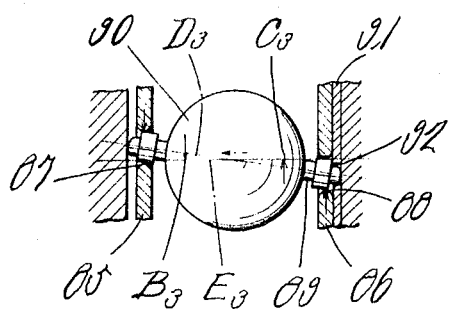
Figure 17:
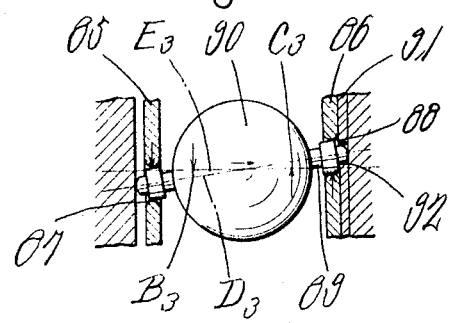

In FIGURE 15, when the driving moment and the supporting moment are balanced, the axis $D_3$ of the shaft 89 is situated in the plane $E_3$, that is, in the neutral position, so that no sliding frictional forces are created at the pressure contact points $B_3$ and $C_3$ and each idler wheel 90 remains in a stable position. If the driving moment overwhelms the supporting moment, the axis $D_3$ deviates from the plane $E_3$ and turns clockwise through a small angle as shown in FIGURE 16. By the same principle as in the preceding embodiments, sliding frictional forces are created in the leftward direction at the pressure contact points $B_3$ and $C_3$ and the shaft 89 is shifted clockwise so as to be inclined as viewed from above, in FIGURE 16, causing a decrease in the speed ratio. Conversely, if the driving moment is less than the supporting moment, the axis $D_3$ turns counterclockwise through a small angle as seen in FIGURE 17, and the shaft 89 is shifted counterclockwise as viewed from above in FIGURE 17, causing an increase in the speed ratio due to the sliding frictional forces created in the rightward direction at the pressure contact points $B_3$ and $C_3$.

Since each shaft 89 is inclined synchronously with the others by rotation of the following plate 91, and the driving moment is varied along with the variation in the load torque, the speed ratio reaches a state of stability at the position where the driving moment and the supporting moment are balanced with repeated automatic actions as described above. Moreover, if the outer peripheries of the needle bearings mounted on ends of the shafts 89 and positioned in the radial guide slots 87 and 88 are coated with elastic material such as rubber (not shown in the figures) of suitable thickness and with said elastic material the ends of the shafts 89 can slide freely along the slots, each shaft 89 can deviate slightly independently of the others. Consequently, each shaft 89 can be shifted with repeated increases and reductions of the speed ratio, independently of the others from a microscopic viewpoint, while being synchronized automatically with the others without any following mechanism from a macroscopic viewpoint, so that the following plate 91 can be omitted.

Figure 18:
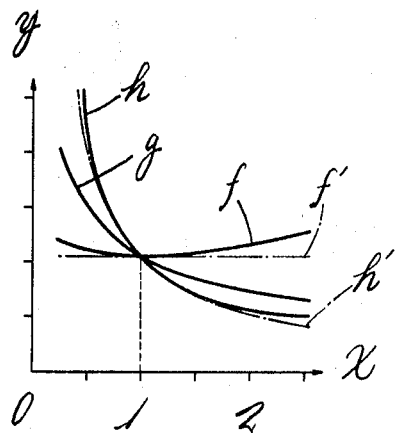
FIGURE 18 is a graph showing the torque speed characteristic thereof.

FIGURE 18 is a graph showing the torque-speed characteristic of the third embodiment. The output driving torque $y$ is the ordinate and the speed ratio $x$ is the abscissa. Thus, the torque-speed characteristics are shown by $f$, $g$, $h$, respectively, when the moment of rotation applied to the guide plates 85 and 86 is maintained constantly and the axis of the setting shaft 101 is positioned at $F_3$, $G_3$, $H_3$, respectively in FIGURE 13. The curves show that $f$ is a torque constant characteristic, $h$ being a power constant characteristic and $g$ is an intermediate characteristic. Thus, by manipulating the handle 103 and causing the setting shaft 101 to be displaced, the torque-speed characteristics can be freely selected and established. Moreover, by providing suitable degrees of curvature for the slots 87 and 88 in the guide plates 85 and 86, a perfect torque constant characteristic such as a straight line $f'$ and a perfect power constant characteristic such as a hyperbolic curve $h'$ can be obtained.

Figure 19:
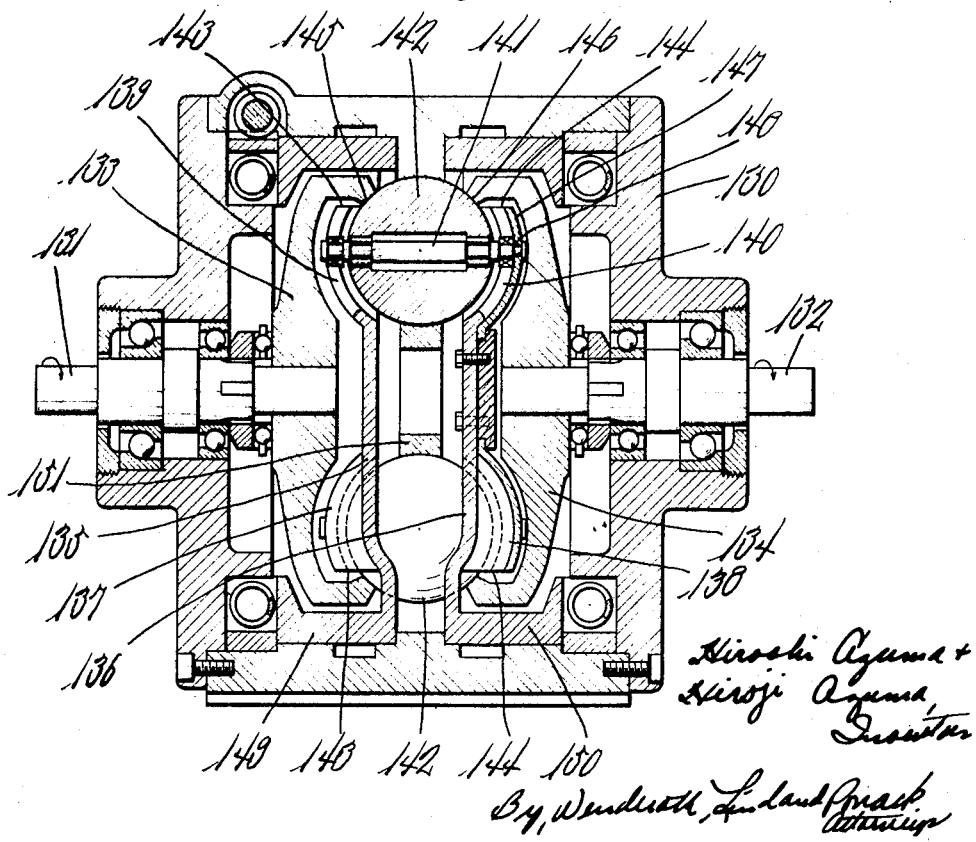
FIGURE 19 is a longitudinal sectional view showing a fourth embodiment of the torque transmission means according to the invention.

The fourth embodiment is shown in FIGURE 19. The inner ends of a driving shaft 131 and a driven shaft 132 are rotatably mounted on a common axis line in bearings in the opposite side walls of the casing 130 with their axes lying in a common plane. A driving and a driven friction wheel 133 and 134 having a concavely frusto-conical shape are mounted on the ends of the shafts and are face to face.

Cylindrical guide plates 149 and 150 are rotatably mounted in the inner periphery of the casing 130 and surround said friction wheels 133 and 134 and are concentric therewith. Guide plates 135 and 136 are integrally formed on the opposed inner sides of said guide pipes.

Said guide plates 135 and 136 have convex portions 137 and 138 which project toward friction wheels 133 and 134, and are spaced around the guide plates at five equal intervals. The ends of support shafts 141 have needle-shaped bearings thereon slidably positioned in radial guide slots 139 and 140 formed at the center of said convex portions 137 and 138, respectively. Spherical idler wheels 142 are rotatably and substantially nonslidably mounted on said shafts 141, respectively and each idler wheel 142 is internally supported on a ring wheel 151 freely rotatable around the common axis of shafts 131 and 132.

Said convex portions 137 and 138 have respective cut off ends 143 and 144 at the outer sides thereof, and the outer faces of said idler wheels 142 projecting past said cut ends 143 and 144 are in pressure contact with the concavely frustoconical surfaces 145 and 146 of the friction wheels 133 and 134.

On the right side face of the guide plate 136 is rotatably mounted a following plate 147 concentric with said plate and the right ends of said shafts 141 are slidably engaged in five helical slots 148 provided in said following plate 147.

The shape and the relation of said slots 139, 140 and 148 are similar to those of the slots 87, 88 and 92 in the third embodiment, and the connection between said guide pipes 149 and 150 integral with said guide plates 135 and 136 and the force supplying relation supplying the supporting moment of rotation to the guide pipes 149 and 150 are also constructed similarly to the third embodiment, so that detailed illustrations of these connections are omitted.

Since the present embodiment, as mentioned above, is almost the same as in the third embodiment, the automatic speed variation is also same. However, in the case of the present embodiment, because the shape of the friction wheels 133 and 134 is concavely frustoconical and the transmission radii of the friction faces 145 and 146 are larger than those of the friction wheels 83 and 84 in the third embodiment, the contact transmission efficiency can be improved and the size of the casing can be reduced.

As made clear by the above described individual embodiments according to the present invention, since each idler wheel is mounted for antifrictional nonslidable rotation on each individual support shaft, each idler wheel carries out smooth power transmission even in a high speed drive. Each support shaft is so mounted as to be capable of freely shifting in either direction along the plane of the common axes and across the contact loci on the driving and the driven friction wheels, and is capable of freely deviating in either direction along said contact loci from a neutral position within a limited range, so that the support shaft is prevented from rocking too much, while at the same time being shifted smoothly at not too rapid a speed. Thus the smooth and stable automatic actions are obtained during both acceleration and reduction of the rotation speed even in a high speed drive.

Moreover, the torque-speed characteristic can be selected and set at the required characteristic suitable for each use by changing the combination of the force supplying means, which is, if necessary, controllable by easy ouside manipulation.

Further, the output driving torque can be adjusted easily by controlling the supporting external forces imparted by the resilient members, e.g., springs. In this case, and still more important, if the supporting external forces are set at negative values so as to be opposed to negative driving forces, the torque transmission means acts as a brake in which the braking power imparting the braking torque is transmitted from the driven shaft to the driving shaft without any consumption of power except the transmission loss. The brake torque-speed characteristic is similar to the forward transmission torque-speed characteristic and is, of course, selectable.

Further, since the automatic actions of the speed ratio variation are caused by the sliding frictional forces produced at the contact points on each idler wheel, it is unnecessary to provide supplementary power means for controlling the speed ratio, for example, a hydraulic power means, a pneumatic power means, an electric power means or the like, so that the torque transmission means has a very simple construction and is inexpensive.

Moreover, even if a sudden shock occurs on the driven shaft, the shock is relieved by the deviating movement of each support shaft of each idler wheel, so that the wheels in the torque transmission means are protected against frictional damages.

The above-mentioned various effects are obtained by utilizing the present invention.

It will be appreciated that various modifications can be supplied within the scope of the present invention regardless of the shape of the wheels.

What we claim is:

1. A friction-type automatically variable stepless speed change torque transmission means comprising;
    a casing;
    a driving shaft and a driven shaft journalled in said casing, the rotational axes of said shafts being spaced apart and parallel with each other;
    a disc-shaped driving friction wheel and a disc-shaped driven friction wheel secured to the inner ends of said driving and driven shafts respectively, said driving and driven friction wheels being arranged face to face and spaced apart;
    a roller-type idler wheel disposed between said driving and driven friction wheels in drivable frictional engagement therewith and a support shaft on which said idler wheel is mounted;
    movable support means rockably mounted in said casing and carrying said idler wheel support shaft for permitting free shifting movement thereof in either direction along a common plane passing through the rotational axes of said disc-shaped wheels freely to change the speed ratio and also for permitting free movement of said idler wheel for a small distance in either direction across the common plane from the neutral position thereof in the common plane;
    and resilient means in pressure engagement with a part of said movable support means for supplying a resilient support force to the support shaft of said idler wheel in a direction perpendicular to the common plane;
    said movable support means including a support frame having said idler wheel rotatably mounted thereon, and a rocker shaft spaced apart from and substantially parallel with the common plane and at right angles to the rotational axes of said driving and driven shafts and freely rockable toward and away from the common plane, said support frame being freely slidable in the axial direction along said rocker shaft.

2. A torque transmission means as claimed in claim 1, wherein said movable support means further includes a balancing shaft rotatably mounted in said casing and spaced from and parallel with the common plane, a pair of rocker arms fixed to said balancing shaft, the one ends of said rocker arms having the rocker shaft mounted thereon, and the other ends of said rocker arms having a counterbalancing weight secured thereto.

3. A torque transmission means as claimed in claim 1, wherein said resilient means comprises a pivot shaft rotatably mounted in said casing and spaced from and parallel to the common plane, a force supplying lever fixed to said pivot shaft and disposed in slidable engagement with said support frame, a force receiving lever fixed to said pivot shaft, and a resilient member in pressing engagement with said force receiving lever.

4. A torque transmission means as claimed in claim 3, wherein said pivot shaft is so positioned that the effective radius of said supplying lever relative to said support frame is equal to the effective transmission radius of one of said disc-shaped wheels.

5. A torque transmission means as claimed in claim 1, wherein said resilient means comprises a pair of pivot shafts rotatably mounted on opposite sides of said support frame in the casing and spaced from and parallel to the common plane, a pair of force supplying levers fixed to the respective pivot shafts and both disposed in slidable engagement with said support frame, a pair of force receiving levers fixed to the respective pivot shafts, and a pair of resilient members arranged in pressing engagement with the respective receiving levers.

6. A torque transmission means as claimed in claim 5, wherein said pivot shafts are so positioned that the effective radii of said supplying levers with respect to said support frame are equal to the effective transmission radii of the respective disc-shaped wheels.

7. A torque transmission means as claimed in claim 1, wherein the resilient means comprises means for adjusting the resilient support force.

8. A friction-type automatically variable stepless speed change torque transmission means comprising;
    a casing;
    a driving shaft and a driven shaft journalled in said casing;
    a pair of transmission shafts journalled side by side in said casing, the rotational axes of said transmission shafts being spaced apart and on opposite sides of and parallel with the rotational axis of said driven shaft;

gear means drivably connecting said transmission shafts to said driving shaft;

a pair of disc-shaped driving friction wheels secured to the inner ends of said transmission shafts;

a disc-shaped driven friction wheel secured to the inner end of said driven shaft, said driving friction wheels and driven friction wheel being arranged face to face and spaced apart from each other;

a pair of roller-type idler wheels arranged symmetrically with the driven shaft and disposed between said driving friction wheels and said driven friction wheels and said driven friction wheel in drivable frictional engagement therewith and a pair of support shafts on which said idler wheels are mounted, respectively;

movable support means rockably mounted in said casing and carrying the idler wheel support shafts for permitting free shifting movement thereof in either direction along a common plane passing through the rotational axes of the disc-shaped wheels freely to change the speed ratio and also for permitting free deviating movement thereof for a small distance in either direction across the common plane from the neutral position thereof in the common plane;

and resilient means in pressure engagement with a part of said movable support means for supplying resilient support forces to the support shafts of said idler wheels through said movable support means in directions perpendicular to the common plane;

said movable support means including a pair of support frames having said respective idler wheels rotatably mounted thereon, and a rocker shaft spaced from and substantially parallel with the common plane and at right angles to the rotational axes of the disc-shaped wheels and freely rockably mounted independently at each end thereof for movement toward and away from the common plane, said support frames being freely slidable in the axial direction along said rocker shaft.

9. A torque transmission means as claimed in claim 8, wherein said resilient means comprises a pair of resilient members in pressing engagement with the end of said rocker shaft respectively for imparting forces to said rocker shaft.

10. A torque transmission means as claimed in claim 8, wherein said resilient means comprises a pair of pivot shafts rotatably mounted in the casing on opposite sides of the support frames and spaced from and parallel with the common plane, a pair of force supplying levers fixed to said pivot shafts and disposed in slidable engagement with said support frames respectively, a pair of force receiving levers fixed to the respective pivot shafts, and a pair of resilient members in pressing engagement with the respective force receiving levers for imparting resilient forces to said support frames in opposite directions to each other.

11. A torque transmission means as claimed in claim 10, wherein said pivot shafts are so positioned that the effective radii of said force supplying levers relative to said individual support frames are equal to the effective transmission radii of the respective driving disc-shaped wheels.

12. A torque transmission means as claimed in claim 8, wherein said resilient means comprises means for adjusting the resilient forces.

13. A friction-type automatically variable stepless speed change torque transmission means comprising;

a casing;

a driving shaft and a driven shaft journalled on a common axis in said casing;

a frustoconical driving friction wheel and a frustoconical driven friction wheel secured to the inner ends of said driving and driven shafts respectively and arranged face to face and spaced apart from each other;

a plurality of spherical idler wheels arranged radially of and symmetrically around the common axis, each of said idler wheels being disposed between said frustoconical friction wheels in drivable frictional engagement therewith and a plurality of support shafts, one for each idler wheel on which said idler wheels are mounted;

movable support means rockably mounted in said casing and carrying the support shafts for said idler wheels for permitting free shifting movement thereof in either direction for inclining the support shafts with respect to the common axis freely to change the speed ratio and also for permitting free deflecting movement thereof through a small angle in either direction across a common plane passing through the common axis from the neutral position thereof in said common plane;

and resilient means in pressure engagement with a part of said movable support means for supplying resilient support forces to the support shafts of said idler wheels at right angles to the individual common planes.

14. A torque transmission means as claimed in claim 13, wherein said torque transmission means further comprises a ring wheel freely rotatably mounted within said casing for rotation about the common axis, said ring wheel being in contact with the spherical surfaces of said spherical wheels generally on the opposite side of said spherical wheels from the side contacting said frustoconical wheels for holding said spherical wheels and said movable support means comprises a pair of guide plates rotatably mounted in said casing for rotation about the common axis and positioned face to face on opposite sides of said idler wheels assembly, each guide plate having a plurality of guide slots therein in which the ends of the individual support shafts for said spherical wheels are slidably mounted, and connecting means connecting said guide plates for rotation in opposite directions to each other, and said resilient means comprises a resilient member in pressing engagement with one of said guide plates for imparting a rotational moment to the guide plate.

15. A torque transmission means as claimed in claim 14, wherein said connecting means comprises a connecting lever, both ends of which are pivotally secured to the respective guide plates, and a setting shaft fixed in the casing for pivoting swingably said connecting lever at the middle portion thereof.

16. A torque transmission means as claimed in claim 15, wherein said connecting means further comprises a manipulating means mounted in the casing for displacing said setting shaft along the longitudinal face of said connecting lever while leaving said setting shaft as to act as a fulcrum for said lever and for coupling said setting shaft to the casing.

17. A torque transmission means as claimed in claim 14, wherein said movable support means further comprises a following plate rotatably mounted in the casing for rotation about the common axis and positioned adjacent to one of said guide plates, said following plate having a plurality of slots therein holding the foremost ends of the support shafts for said spherical wheels therein, whereby all of the spherical wheels are synchronously shifted to an inclined position on rotation of said following plate.

18. A torque transmission means as claimed in claim 13, wherein the frustoconical surfaces of said frustoconical wheels have identical concave shapes, and all of the spherical wheels are internally frictionally engaged with both said concave frustoconical wheels.

19. A torque transmission means as claimed in claim

13 wherein the resilient means comprises means for adjusting the resilient support forces.

References Cited

UNITED STATES PATENTS

| | | | |
|---|---|---|---|
| 3,010,330 | 11/1961 | Perruca | 74—200 |
| 3,033,048 | 5/1962 | Perruca | 74—200 |
| 3,242,748 | 3/1966 | Prager | 74—200 |
| 3,292,443 | 12/1966 | Perruca | 74—200 |
| 568,367 | 9/1896 | Osgood | 74—200 |
| 2,959,972 | 11/1960 | Madson | 74—200 |
| 3,277,745 | 10/1966 | Harned et al. | 74—200 XR |
| 3,371,546 | 3/1968 | Spangler et al. | 74—200 |

FRED C. MATTERN, Jr., Primary Examiner

JAMES A. WONG, Assistant Examiner